(12) United States Patent
Chang et al.

(10) Patent No.: US 11,487,441 B2
(45) Date of Patent: Nov. 1, 2022

(54) MANAGING TAMPER DETECTIONS IN SECURE MEMORY DEVICES

(71) Applicant: Macronix International Co., Ltd., Hsinchu (TW)

(72) Inventors: Chin-Hung Chang, Tainan (TW); Chia-Feng Cheng, Hsinchu (TW)

(73) Assignee: Macronix International Co., Ltd., Hsinchu (TW)

( * ) Notice: Subject to any disclaimer, the term of this patent is extended or adjusted under 35 U.S.C. 154(b) by 205 days.

(21) Appl. No.: 16/862,129

(22) Filed: Apr. 29, 2020

(65) Prior Publication Data

US 2021/0342065 A1    Nov. 4, 2021

(51) Int. Cl.
| | |
|---|---|
| *G06F 3/06* | (2006.01) |
| *G06F 21/86* | (2013.01) |
| *G06F 21/87* | (2013.01) |
| *G06F 21/79* | (2013.01) |
| *H04Q 9/00* | (2006.01) |
| *G06F 12/14* | (2006.01) |
| *G06Q 20/20* | (2012.01) |

(52) U.S. Cl.
CPC .......... *G06F 3/062* (2013.01); *G06F 3/0659* (2013.01); *G06F 3/0679* (2013.01); *G06F 21/79* (2013.01); *G06F 21/86* (2013.01); *G06F 21/87* (2013.01)

(58) Field of Classification Search
CPC ...... G06F 3/062; G06F 3/0679; G06F 3/0659; G06F 21/79; G06F 21/86; G06F 21/87
See application file for complete search history.

(56) References Cited

U.S. PATENT DOCUMENTS

| | | | |
|---|---|---|---|
| 7,945,792 B2 | 5/2011 | Cherpantier | |
| 9,569,640 B2* | 2/2017 | Subramanian | .......... G06F 21/79 |

(Continued)

FOREIGN PATENT DOCUMENTS

CN    110288072 A    8/2019

OTHER PUBLICATIONS

"Anti-Tamper Techniques"—Royal Institute of Technology, Stockholm Sweden, Jun. 2018 https://docplayer.net/79391807-Anti-tamper-techniques-elena-dubrova-royal-institute-of-technology-stockholm-sweden.html (Year: 2018).*

(Continued)

*Primary Examiner* — Randy A Scott
(74) *Attorney, Agent, or Firm* — Fish & Richardson P.C.

(57) ABSTRACT

Systems, methods, circuits, devices, and apparatus including computer-readable mediums for managing tamper detections in secure memory devices. In one aspect, a secure memory device includes: a memory cell array, one or more tamper detectors each configured to detect a respective type of tamper event on at least part of the secure memory device, and a tamper detection status register storing one or more values each indicating a tamper detection status detected by a corresponding tamper detector. The secure memory device can include a command interface coupled to the tamper detection status register and configured to output the values stored in the tamper detection status register when receiving a trigger. The secure memory device can also include an output pin coupled to the tamper detection status register and be configured to automatically output the values stored in the tamper detection status register via the output pin.

21 Claims, 7 Drawing Sheets

(56) References Cited

U.S. PATENT DOCUMENTS

| | | | |
|---|---|---|---|
| 10,127,409 B1* | 11/2018 | Wade | G06Q 20/30 |
| 11,132,659 B2* | 9/2021 | Bilhan | G06Q 20/206 |
| 2005/0198521 A1 | 9/2005 | Nakazawa | |
| 2014/0337642 A1 | 11/2014 | Takahashi | |
| 2015/0130636 A1* | 5/2015 | Bowling | H04Q 9/00 |
| | | | 340/870.09 |
| 2017/0103233 A1 | 4/2017 | Sibert | |
| 2019/0012490 A1 | 1/2019 | Khatri et al. | |

OTHER PUBLICATIONS

"Tamper-Detection Interface"—Digi International Inc., Feb. 23, 2020 https://www.digi.com/resources/documentation/digidocs/90001514/concept/trustfence/c_tamper_interface.htm (Year: 2020).*

Dubrova, Elena, "Anti-Tamper Techniques", Royal Institute of Technology, Stockholm, Sweden, 49 pages.

Digi International Inc., "Tamper-detection interface", downloaded on Feb. 23, 2020, https://www.digi.com/resources/documentation/digidocs/90001514/concept/trustfence/c_tamper_interface.htm, 3 pages.

\* cited by examiner

MANAGING TAMPER DETECTIONS IN SECURE MEMORY DEVICES

BACKGROUND

Protecting memory devices or systems from unintentional overwrites, malicious attacks and cloning is essential. Memory devices can include specific features to meet security requirements. However, if hackers have physical access to such secure memory devices, they can directly tamper with applications or replace function calls to their own functions.

SUMMARY

The present disclosure describes systems and techniques for managing tamper detections in secure memory devices, e.g., non-volatile memory devices.

One aspect of the present disclosure features a secure memory device including: a memory cell array having a plurality of memory cells; one or more tamper detectors, each of the one or more tamper detectors being configured to detect a respective type of tamper event on at least part of the secure memory device; and a tamper detection status register storing one or more values, each of the one or more values indicating a tamper detection status detected by a corresponding one of the one or more tamper detectors.

In some implementations, each of the one or more tamper detectors can be coupled to the tamper detection status register and configured to update a corresponding value in the tamper detection status register when the tamper detector detects a corresponding tamper event. Each of the one or more tamper detectors can be configured to: detect a change of a corresponding parameter associated with the at least part of the secure memory device; determine whether the detected change of the corresponding parameter exceeds a threshold; in response to determining that the detected change of the corresponding parameter does not exceed the threshold, keep detecting the change of the corresponding parameter; and in response to determining that the detected change of the corresponding parameter exceeds the threshold, transmit a command to the tamper detection status register to update the corresponding value in the tamper detection status register.

In some implementations, the corresponding value is stored by a corresponding bit in the tamper detection status register. The corresponding bit can be updated to logic 1 when the tamper detector detects the corresponding tamper event, the corresponding bit being logic 0 indicating that there is no corresponding tamper event detected by the tamper detector.

In some implementations, the corresponding value is stored by a corresponding counter in the tamper detection status register, and the corresponding value is increased when the tamper detector detects the corresponding tamper event. The corresponding value can be increased by 1 when the tamper detector detects the corresponding tamper event.

In some implementations, the secure memory device includes a command interface coupled to the tamper detection status register and configured to output the one or more values stored in the tamper detection status register.

In some implementations, the command interface includes: a command decoder configured to decode an incoming command; and a multiplexer coupled to the memory cell array, the tamper detection status register, and the command decoder, where the multiplexer is controlled based on a result of decoding the incoming command to enable access to one of the memory cell array and the tamper detection status register.

The command decoder can be configured to decode the incoming command to be a read command for the tamper detection status of the at least one of the secure memory device, and the multiplexer can be controlled to output the one or more values stored in the tamper detection status register. In some examples, the incoming command includes one of: a specific command code, and a specific signal. The specific signal can include a predetermined signal, e.g., a high level voltage signal, or a toggle signal.

In some examples, the command decoder is configured to decode the incoming command to be an operation command on the memory cell array, and the multiplexer is controlled to enable access to the memory cell array. The operation command can include at least one of: a read command for reading data stored in the memory cell array, a write command for storing data in the memory cell array, or an erase command for erasing data stored in the memory cell array.

In some implementations, the command interface includes: a first pin coupled to the command decoder via a first buffer, and a second pin coupled to the multiplexer via a second buffer. The first pin can be a serial input pin and the first buffer can be an input buffer. The second pin can be a serial output pin and the second buffer can be an output buffer.

In some implementations, the command interface includes: a multiplexer coupled to the memory cell array and the tamper detection status register and a pin coupled to the multiplexer, where the multiplexer is configured to output the one or more values stored in the tamper detection status register when the pin is driven with a specific command. The pin can be a serial pin on a data bus or an additional pin.

In some implementations, the secure memory device includes an output pin coupled to the tamper detection status register. The secure memory device is configured to output the one or more values stored in the tamper detection status register via the output pin. The secure memory device can be configured to automatically output the one or more values stored in the tamper detection status register via the output pin after the secure memory device is powered on. The secure memory device can further include an output buffer coupled between the tamper detection status register and the output pin. The output pin can be additional to one or more serial output pins coupled to the memory cell array.

The one or more tamper detectors can include at least one of: a temperature detector, a voltage detector, a radiation detector, or laser direct structuring (LDS) circuitry. The temperature detector can be configured to detect a change of an operating temperature of the at least part of the secure memory device. The voltage detector can be configured to detect a change of an operating voltage of the at least part of the secure memory device. The radiation detector can be configured to detect an X-ray or ion beam on the at least part of the secure memory device. The LDS circuitry can include: an intrusion detection mesh wrapped around the at least part of the secure memory device, and a sensor configured to monitor a change of a parameter of the intrusion detection mesh, where the parameter includes a capacitance, an inductance, or a resistance.

The tamper detection status register can be in a static random access memory (SRAM). The secure memory device can include a backup battery for the one or more tamper detectors and the tamper detection status register.

Another aspect of the present disclosure features a system including: a secure memory device and a host device. The secure memory device includes: a memory cell array having a plurality of memory cells; one or more tamper detectors, each of the one or more tamper detectors being configured to detect a respective type of tamper event on at least part of the secure memory device; and a tamper detection status register storing one or more values, each of the one or more values indicating a tamper detection status detected by a corresponding one of the one or more tamper detectors. The host device is coupled to the secure memory device and configured to: obtain the one or more values stored in the tamper detection status register from the secure memory device, and determine whether the secure memory device has been tampered based on the obtained one or more values.

In some implementations, the secure memory device includes: a command decoder configured to receive an incoming command from the host device via a serial input pin and to decode the incoming command; and a multiplexer coupled to the memory cell array, the tamper detection status register, and the command decoder, the multiplexer being controlled based on a result of decoding the incoming command to enable access to one of the memory cell array and the tamper detection status register. The command decoder can be configured to decode the incoming command to be a read command for the tamper detection status of the secure memory device, and the multiplexer can be controlled to access the tamper detection status register and output the one or more values stored in the tamper detection status register via a serial output pin to the host device.

In some implementations, the secure memory device includes an output pin coupled to the tamper detection status register, the output pin being additional to one or more serial pins coupled to the memory cell array. The secure memory device can be configured to automatically output the one or more values stored in the tamper detection status register via the output pin to the host device.

The host device can be configured to: in response to determining that the secure memory device has been tampered, perform a tamper response on the secure memory device. The tamper response can include at least one of: powering down the secure memory device, disabling the secure memory device, erasing data stored in the secure memory device, or physically destroying the secure memory device.

A further aspect of the present disclosure features a method of managing tamper detections in a secure memory device. The method includes: receiving one or more values stored in a tamper detection status register in the secure memory device via an output pin, the secure memory device including one or more tamper detectors each configured to detect a respective type of tamper event on the secure memory device, each of the one or more values indicating a tamper detection status detected by a corresponding one of the one or more tamper detectors; determining whether the secure memory device has been tampered based on the received one or more values in the tamper detection status register; and in response to determining that the secure memory device has been tampered, performing a tamper response on the secure memory device.

The method can further include transmitting a read command via an input pin to the secure memory device, the read command being for reading the tamper detection status of the secure memory device. The method can further include: determining whether an operation command is performed on the secure memory device, and the read command is transmitted to the secure memory device in response to determining that there is no operation command on the secure memory device.

A fourth aspect of the present disclosure features a secure memory device including: a memory cell array having a plurality of memory cells; a plurality of tamper detectors, each of the plurality of tamper detectors being configured to detect a respective type of tamper event on at least part of the secure memory device; and a plurality of tamper detection status registers, each of the tamper detection status registers being coupled to a different corresponding tamper detector of the plurality of tamper detectors and storing a respective value indicating a tamper detection status detected by the different corresponding tamper detectors.

The secure memory device can further include a plurality of output pins, each of the plurality of output pins being coupled to a different corresponding tamper detection status register of the plurality of tamper detection status registers. The secure memory device can be configured to output the respective values stored in the plurality of tamper detection status registers via the plurality of output pins. The secure memory device can further include a plurality of serial pins coupled to the memory cell array, and the plurality of output pins are additional to the plurality of serial pins.

Note that herein the term "secure memory device" represents a memory device (or memory) that is secured with tamper protection, e.g., with tamper detection and/or tamper response. The memory device (or memory) itself can optionally provide additional security to data stored in the memory device (or memory). The term "tamper status" means whether or not a secure memory device has been subject to tampering. Note that the term "tamper status of a secure memory device" means tamper status of at least part of the secure memory device, e.g., a partial region of the secure memory device such as a memory cell array of the secure memory device, or the secure memory device. Similarly, the term "tamper detection on a secure memory device" means tamper detection on at least part of the secure memory device, e.g., a partial region of the secure memory device such as a memory cell array of the secure memory device, or the secure memory device. The term "tamper detection status of a secure memory device" means tamper detection status of at least part of the secure memory device, e.g., a partial region of the secure memory device such as a memory cell array of the secure memory device, or the secure memory device. The term "tamper event on a secure memory device" means tamper event on at least part of the secure memory device, e.g., a partial region of the secure memory device such as a memory cell array of the secure memory device, or the secure memory device.

Implementations of the above techniques include methods, systems, circuits, computer program products and computer-readable media. In one example, a method can be performed in a system and the method can include the above-described actions, e.g., the actions for managing tamper detections in security devices in the system. In another example, one such computer program product is suitably embodied in a non-transitory machine-readable medium that stores instructions executable by one or more processors. The instructions are configured to cause the one or more processors to perform the above-described actions. One such computer-readable medium stores instructions that, when executed by one or more processors, are configured to cause the one or more processors to perform the above-described actions.

The details of one or more disclosed implementations are set forth in the accompanying drawings and the description below. Other features, aspects, and advantages will become apparent from the description, the drawings and the claims.

DETAILED DESCRIPTION

Figure 1A:
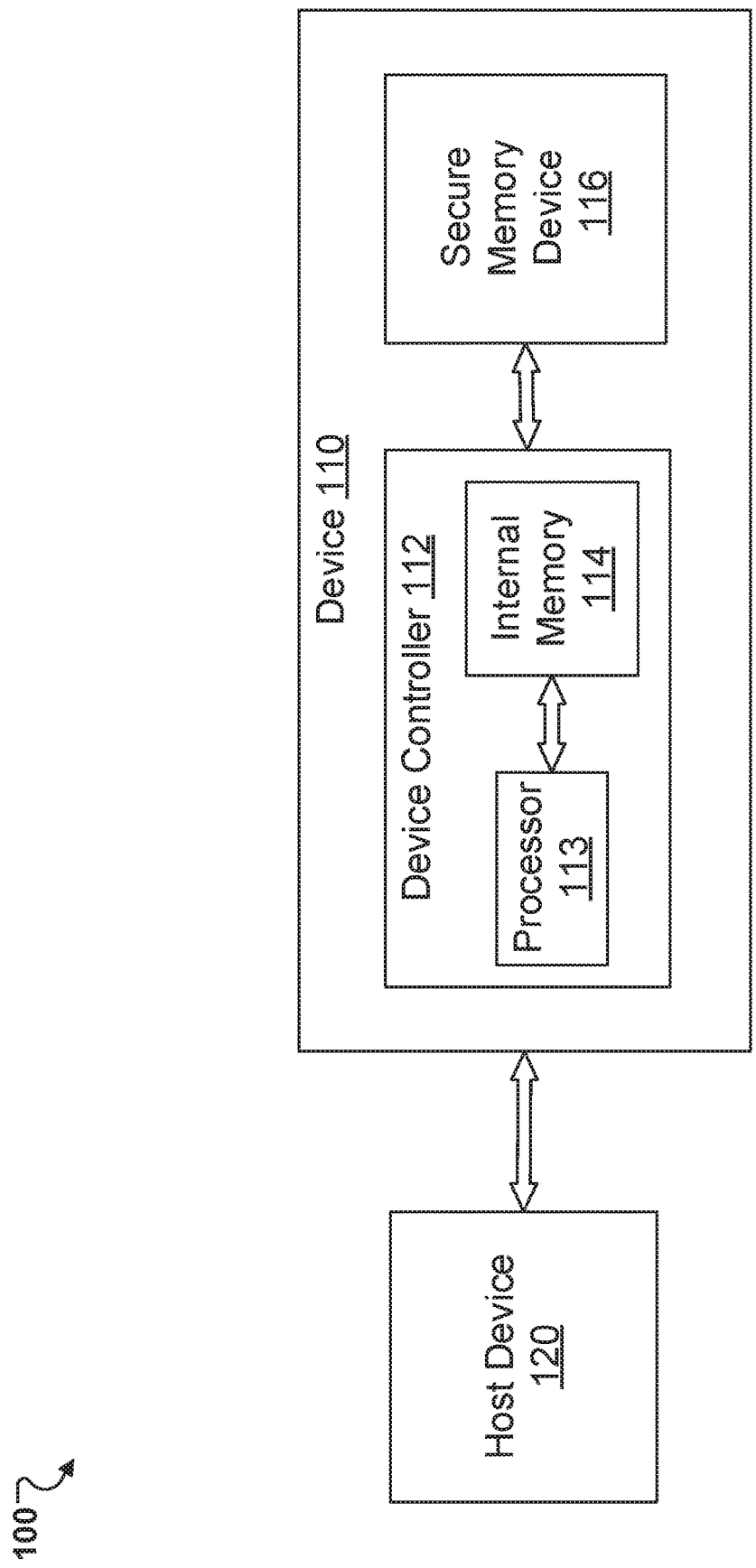
FIG. 1A illustrates an example of a system including a secure memory device, according to one or more implementations of the present disclosure.

It is possible to physically tamper with memory devices, e.g., to alter applications or replace function calls. Therefore, it is desirable to develop techniques for effectively detecting tampering attempts on security memory devices and outputting results of the tamper detections.

Implementations of the present disclosure provide a secure memory device with tamper detection and output. The secure memory device can include a memory cell array, one or more tamper detectors (or tamper sensors) for detecting a tamper status of at least part of the secure memory device (e.g., the memory cell array or the secure memory device), and a tamper detection status register storing one or more values (e.g., bits) each indicating a tamper detection status detected by a corresponding one of the tamper detectors. Each tamper detector can function independently from each other and be configured to a corresponding type of tamper event. In some examples, the tamper detectors include at least one of: a temperature sensor for detecting a change in an operating temperature of the at least part of the secure memory device, a voltage sensor for detecting a change in an operating voltage of the at least part of the secure memory device, a radiation sensor for detecting for X-rays and ion beams on the at least part of the secure memory device, or a laser direct structuring (LDS) circuitry shield wrapped around the at least part of the secure memory device, e.g., critical hardware areas including the memory cell array, for detecting an attempted intrusion.

In some implementations, if a tamper detector detects a tamper event, a corresponding bit in the register can be updated to logic 1, e.g., from logic 0, in any suitable condition, e.g., in a normal operation mode or in a low power mode including power off if battery backup (e.g., a built-in battery) is provided. By using the tamper detection status register, the tamper detection status of the at least part of the secure memory device detected by different tamper detectors can be stored, updated, and simultaneously output, which can enhance the detection speed, accuracy and efficiency.

The tamper detection status can be output by a trigger event. In some examples, a host device can issue a read command for tamper detection status to the secure memory device, and the secure memory device can output the values stored in the tamper detection status register to the host device. The read command can be a signal (e.g., a high voltage signal or a toggle signal) or a specific command code (e.g., 10101010). The read command can be delivered to the secure memory device through a data bus pin, e.g., an SIO (serial input/output) pin.

In some examples, the data bus can be expanded to add an additional output pin coupled to the tamper detection status register. The additional output pin can also output, e.g., automatically, the values stored in the tamper detection status register, such that the host device can keep monitoring the tamper detection status of the at least part of the secure memory device (e.g., the memory cell array or the secure memory device). For example, after the secure memory device is powered on, the secure memory device can automatically output the values stored in the tamper detection status register through the additional output pin to the host device. In some implementations, a built-in battery can be provided to the tamper detectors and the tamper detection status register. The tamper detectors and the tamper detection status register can keep functioning to update the tamper detection status even when the secure memory device is powered off. An initial state of the additional output pin can be high impedance (high Z), 1, or 0. In some implementations, the secure memory device can include one or more additional output pins, each of which can be coupled to a corresponding tamper detector for outputting a tamper detection status detected by the tamper detector or to a corresponding register storing a value indicating the tamper detection status detected by the corresponding tamper detector.

The techniques disclosed herein can effectively detect tampering attempts on secure memory devices and output results of the tamper detections. The techniques can be implemented for any type of circuits, devices, or systems that need tamper detections and/or outputs. For example, besides memory systems, the techniques can be also applied to any other storage devices that utilize security engines and/or include tamper detections and/or outputs. The techniques can be applied to various types of volatile memory devices or non-volatile memory devices, such as NOR flash memory, NAND flash memory, resistive random-access memory (RRAM), phase-change random-access memory (PCRAM), among others. The techniques can be applied to various memory types, such as SLC (single-level cell) devices, MLC (multi-level cell) devices like 2-level cell devices, TLC (triple-level cell) devices, QLC (quad-level cell) devices, or PLC (penta-level cell) devices. Additionally or alternatively, the techniques can be applied to various types of devices and systems, such as secure digital (SD) cards, embedded multimedia cards (eMMC), or solid-state drives (SSDs), embedded systems, among others.

FIG. 1A illustrates an example of a system 100. The system 100 includes a device 110 and a host device 120. The device 110 can be a memory system including a device controller 112 and a secure memory device 116. The device controller 112 includes a processor 113 and an internal memory 114.

In some implementations, the device 110 is a storage device. For example, the device 110 can be an embedded multimedia card (eMMC), a secure digital (SD) card, a solid-state drive (SSD), or some other suitable storage. In some implementations, the device 110 is a smart watch, a digital camera or a media player. In some implementations, the device 110 is a client device that is coupled to a host device 120. For example, the device 110 is an SD card in a digital camera or a media player that is the host device 120.

The device controller 112 is a general-purpose microprocessor, or an application-specific microcontroller. In some implementations, the device controller 112 is a memory controller for the device 110. The following sections describe the various techniques based on implementations in which the device controller 112 is a memory controller. However, the techniques described in the following sections are also applicable in implementations in which the device controller 112 is another type of controller that is different from a memory controller.

The processor 113 is configured to execute instructions and process data. The instructions include firmware instructions and/or other program instructions that are stored as firmware code and/or other program code, respectively, in the secondary memory. The data includes program data corresponding to the firmware and/or other programs executed by the processor, among other suitable data. In some implementations, the processor 113 is a general-purpose microprocessor, or an application-specific microcontroller. The processor 113 is also referred to as a central processing unit (CPU).

The processor 113 accesses instructions and data from the internal memory 114. In some implementations, the internal memory 114 is a Static Random Access Memory (SRAM) or a Dynamic Random Access Memory (DRAM). For example, in some implementations, when the device 110 is an eMMC, an SD card or a smart watch, the internal memory 114 is an SRAM. In some implementations, when the device 110 is a digital camera or a media player, the internal memory 114 is DRAM.

In some implementations, the internal memory is a cache memory that is included in the device controller 112, as shown in FIG. 1A. The internal memory 114 stores instruction codes, which correspond to the instructions executed by the processor 113, and/or the data that are requested by the processor 113 during runtime.

The device controller 112 transfers the instruction code and/or the data from the secure memory device 116 to the internal memory 114. In some implementations, the secure memory device 116 is a non-volatile memory that is configured for long-term storage of instructions and/or data, e.g., an NAND or NOR flash memory device, or some other suitable non-volatile memory device. In implementations where the secure memory device 116 is an NAND flash memory, the device 110 is a flash memory device, e.g., a flash memory card, and the device controller 112 is an NAND flash controller. For example, in some implementations, when the device 110 is an eMMC or an SD card, the secure memory device 116 is an NAND flash memory; in some implementations, when the device 110 is a digital camera, the secure memory device 116 is an SD card; and in some implementations, when the device 110 is a media player, the secure memory device 116 is a hard disk. In some implementations where the secure memory device 116 is an NOR flash memory, the device 110 can optionally include the device controller 112. In some cases, the device 110 can include no device controller and the secure memory device 116 can directly communicate with the host device 120.

Figure 1B:
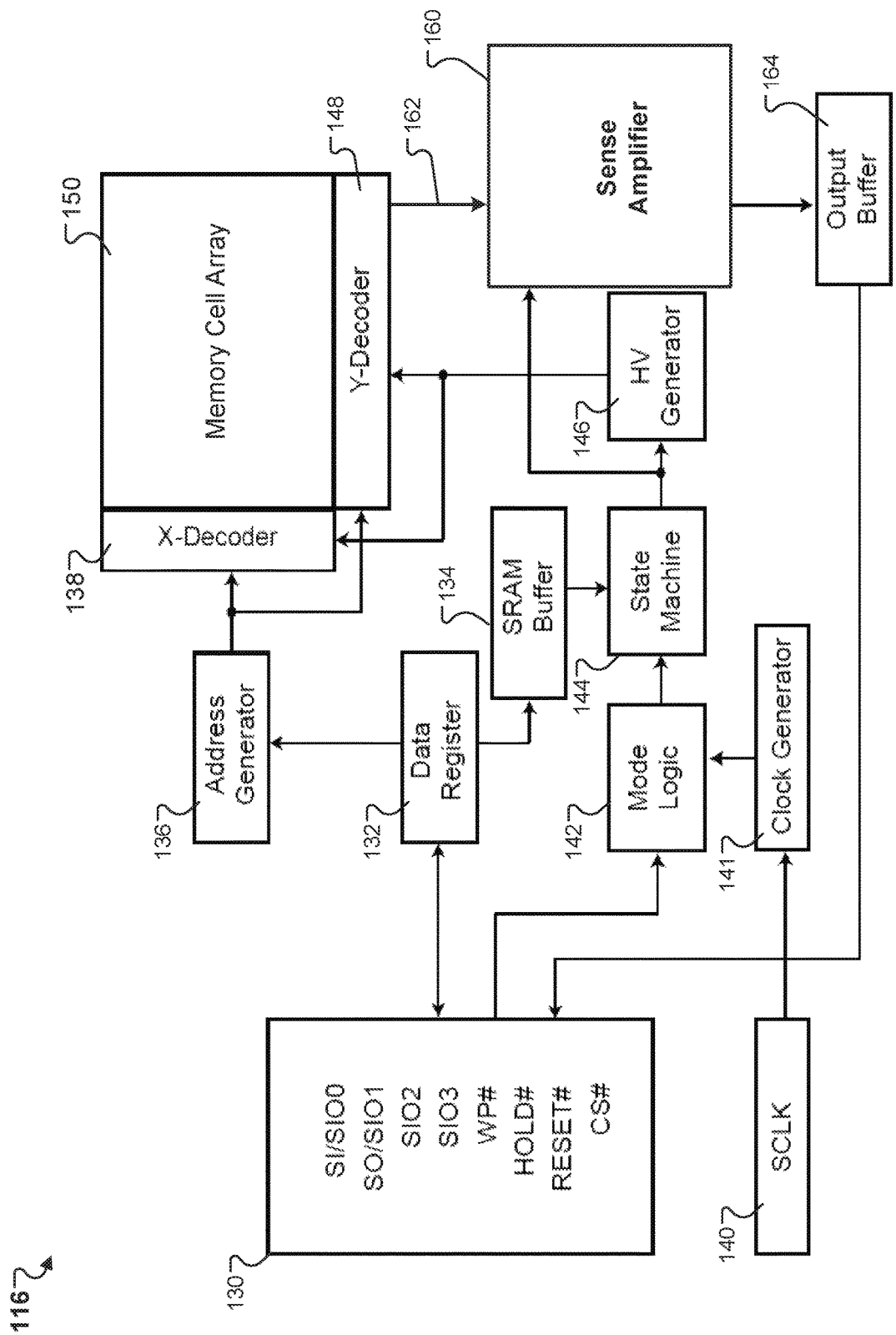
FIG. 1B illustrates a block diagram of an example of a secure memory device, according to one or more implementations of the present disclosure.

FIG. 1B illustrates an example configuration of the secure memory device 116. Components in the secure memory device 116 can be integrated onto a board, e.g., a Si-based carrier board, and be packaged. The secure memory device 116 can have a memory cell array 150 that can include a number of memory cells. The memory cells can be coupled in series to a number of row word lines and a number of column bit lines. Each memory cell can include a memory transistor configured as a storage element to store data. The memory transistor can include a silicon-oxide-nitride-oxide-silicon (SONOS) transistor, a floating gate transistor, a nitride read only memory (NROM) transistor, or any suitable non-volatile memory MOS device that can store charges. The secure memory device 116 can include an X-decoder (or row decoder) 138 and a Y-decoder (or column decoder) 148. Each memory cell can be coupled to the X-decoder 138 via a respective word line and coupled to the Y-decoder 148 via a respective bit line. Accordingly, each memory cell can be selected by the X-decoder 138 and the Y-decoder 148 for read or write operations through the respective word line and the respective bit line.

The secure memory device 116 can include a memory interface 130 having multiple pins configured to be coupled to an external device, e.g., the device controller 112 and/or the host device 120. The pins can include SI/SIO0 for serial data input/serial data input & output, SO/SIO1 for serial data output/serial data input &output, SIO2 for serial data input or output, WP # for write protection active low, Hold # for a holding signal input, RESET # for hardware reset pin active low, and CS # for chip select.

The secure memory device 116 can include a data register 132, an SRAM buffer 134, an address generator 136, a synchronous clock (SCLK) input 140, a clock generator 141, a mode logic 142, a state machine 144, and a high voltage (HV) generator 146. The SCLK 140 can be configured to receive a synchronous clock input and the clock generator 141 can be configured to generate a clock signal for the secure memory device 116 based on the synchronous clock input. The mode logic 142 can be configured to determine whether there is a read or write operation and provide a result of the determination to the state machine 144. The secure memory device 116 can also include a sense amplifier 160 that can be connected to the Y-decoder 148 by a data line 162 and an output buffer 164 for buffering an output signal from the sense amplifier 160 to the memory interface 130. The sense amplifier 160 can be part of the read circuitry that is used when data is read from the secure memory device 116. The sense amplifier 160 can be configured to sense low power signals from a bit line that represents a data bit (1 or 0) stored in a memory cell and to amplify small voltage swings to recognizable logic levels so the data can be interpreted properly.

The host device 120 can generate commands, such as read commands, write commands, and/or erase commands that can be executed respectively to read data from, write data to, and/or erase data in the secure memory device 116. Data being written to or read from the secure memory device 116 can be communicated or transmitted between the secure memory device 116 and the host device 120 and/or other components via a data bus (e.g., a system bus), which can be a multi-bit bus.

In some examples, during a write operation, the secure memory device 116 can receive a write command from the host device 120. The data register 132 can register input data from the memory interface 130, and the address generator 136 can generate corresponding physical addresses to store the input data in specified memory cells of the memory cell array 150. The address generator 136 can be connected to the X-decoder 138 and Y-decoder 148 that are controlled to select the specified memory cells through corresponding word lines and bit lines. The SRAM buffer 134 can retain the input data from the data register 132 in its memory as long as power is being supplied. The state machine 144 can process a write signal from the SRAM buffer 134 and provide a control signal to the HV generator 146 that can generate a write voltage and provide the write voltage to the X-decoder 138 and the Y-decoder 148. The Y-decoder 148 can be configured to output the write voltage to the bit lines for storing the input data in the specified memory cells.

In some examples, during a read operation, the secure memory device 116 can receive a read command from the host device 120 through the memory interface 130. The state machine 144 can provide control signals to the HV generator 146 and the sense amplifier 160. The HV generator 146 can provide a voltage to the X-decoder 138 and the Y-decoder 148 for selecting a memory cell. The sense amplifier 160 can sense a small power (voltage or current) signal from a bit line that represents a data bit (1 or 0) stored in the selected memory cell and amplify the small power signal swing to recognizable logic levels so the data bit can be interpreted properly by logic outside the secure memory device 116. The output buffer 164 can receive the amplified voltage from the sense amplifier 160 and output the amplified power signal to the logic outside the secure memory device 116 through the memory interface 130.

In some implementations, the secure memory device 116 can be a secure memory where data can be securely stored. As described with further details in FIGS. 2 and 6, the secure memory device 116 can include one or more tamper detectors for detecting tampering events (e.g., tamper attempts or attacks) on at least part of the secure memory device 116, e.g., the memory cell array 150 or the secure memory device 116), and a tamper detection status register having bits indicating a tamper detection status for each tamper detector, i.e., whether the tamper detector has detected tampering. The tamper detection status register can be separate from the memory cell array 150. In some cases, the tamper detection status register can be in an SRAM.

When a tamper detector detects a tamper event on the at least part of the secure memory device 116, e.g., the memory cell array 150 or the secure memory device 116, the tamper detector can output a signal or command to update a corresponding bit in the tamper detection status register, e.g., changing a logic level from an initial value "0" indicating an untampered status to a new value "1" indicating a tampered status. Thus, the corresponding bit indicates a tamper detection status of the at least part of the secure memory device 116 detected by the tamper detector. The bits in the tamper detection status register can indicate the tamper detection status of the at least part of the secure memory device 116 detected by the tamper detectors in the secure memory device 116, as illustrated and described with further details in FIG. 4.

Figure 2:
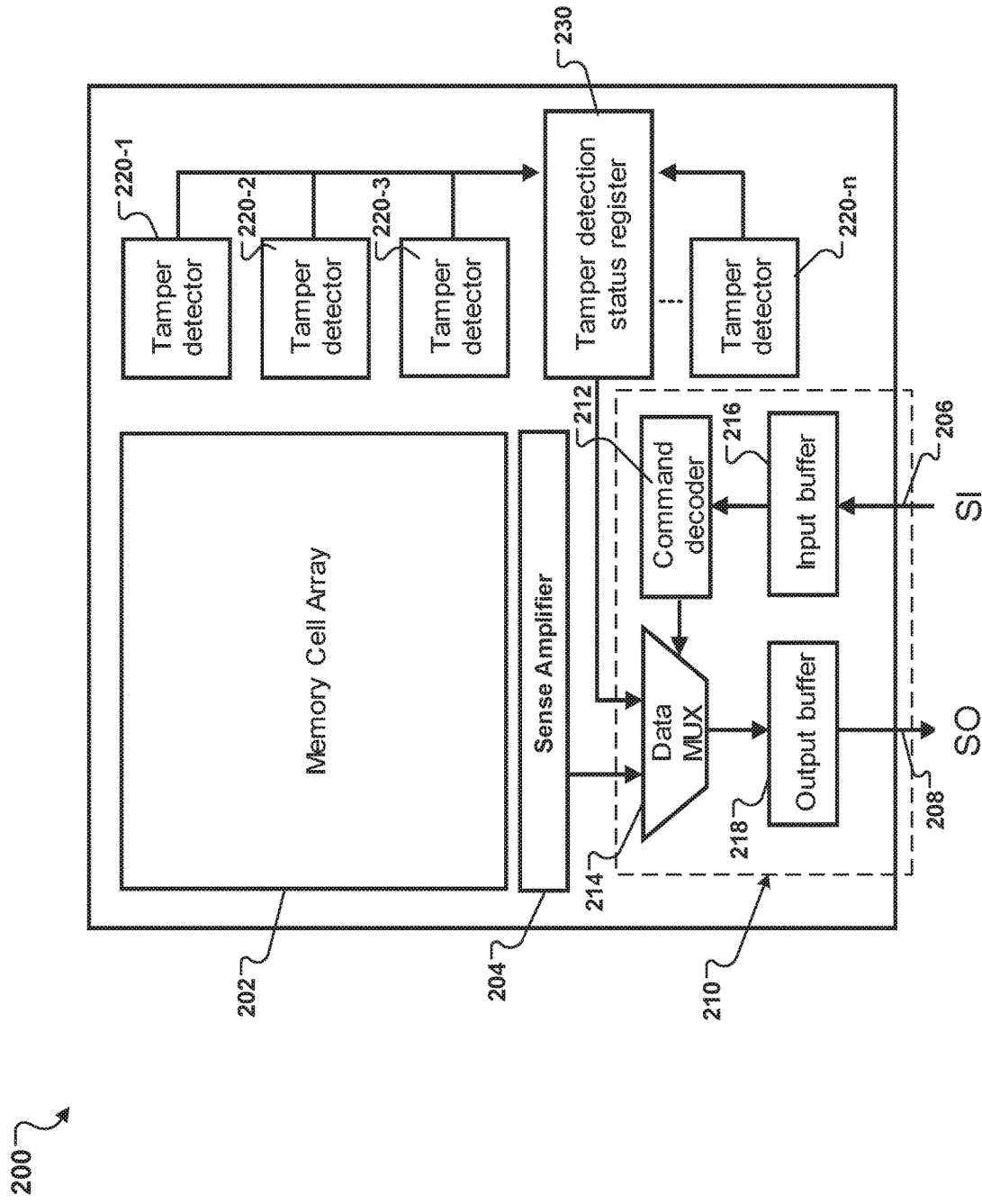
FIG. 2 illustrates a block diagram of an example of a secure memory device with tamper detection and output, according to one or more implementations of the present disclosure.
Figures 3, 4:
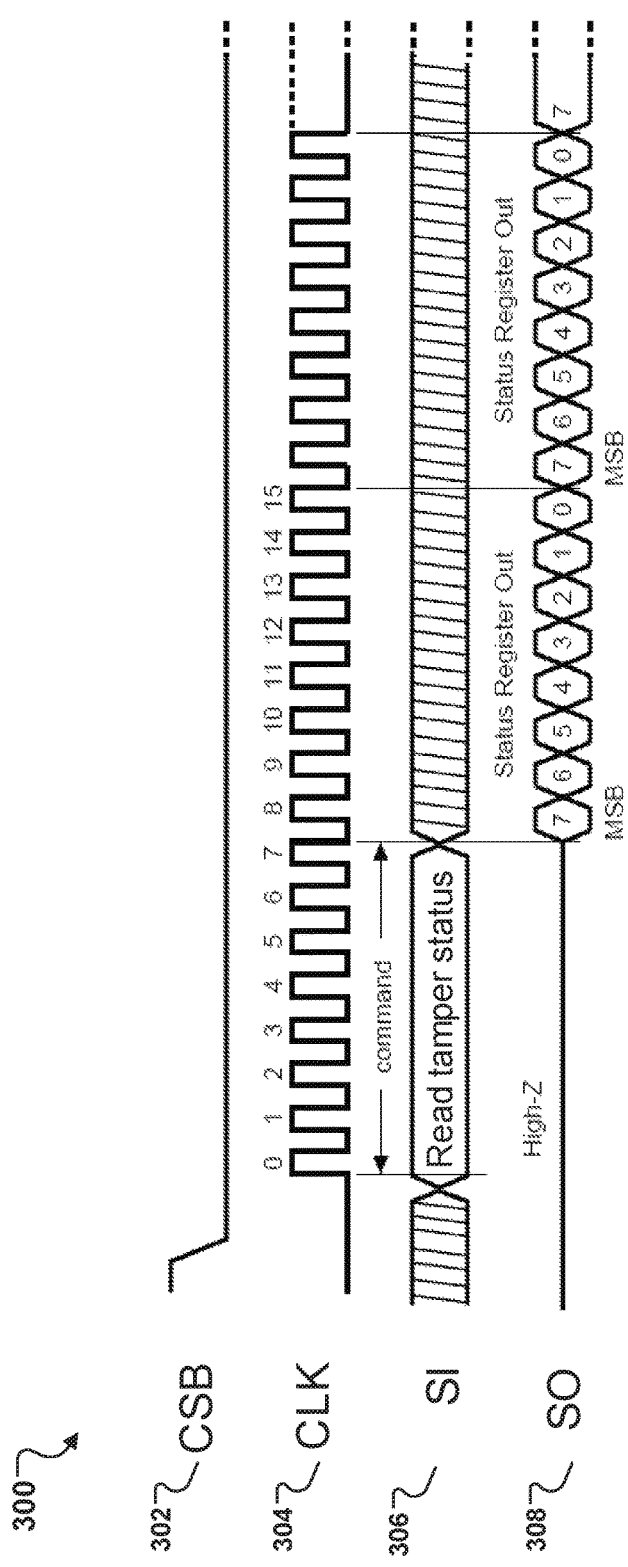
FIG. 3 illustrates a circuit timing diagram showing a read out of a tamper detection status of a secure memory device, according to one or more implementations of the present disclosure.
FIG. 4 illustrates a tamper detection status register, according to one or more implementations of the present disclosure.
Figure 6:
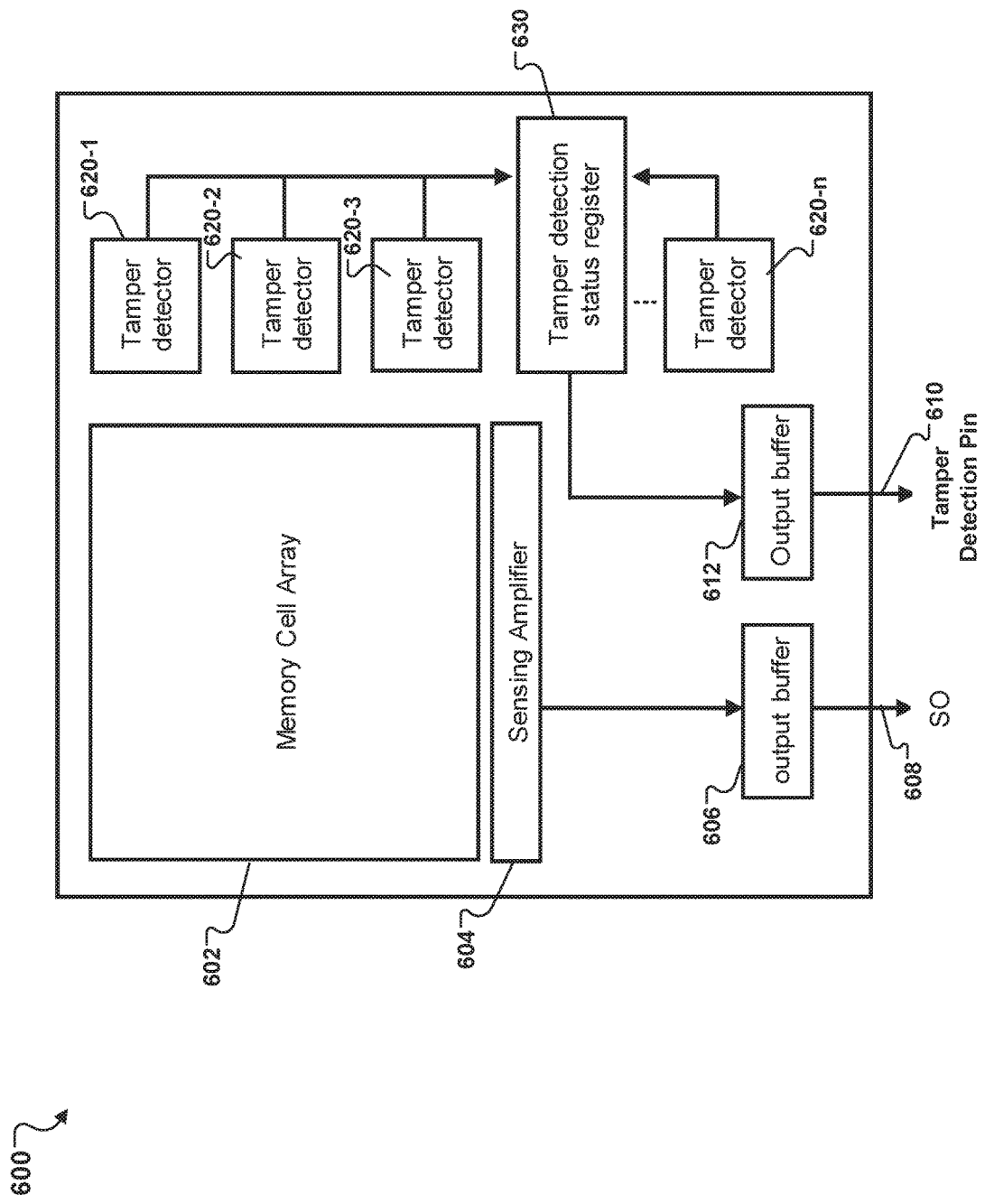
FIG. 6 illustrates a block diagram of another example of a secure memory device with tamper detection and output, according to one or more implementations of the present disclosure.

The bits in the tamper detection status register can be read or output at the same time, for example, as illustrated and described with further details in FIGS. 2, 3, and 6, to the host device 120. The host device 120 can determine whether the secure memory device 116 has been subject to tampering based on the received bits in the tamper detection status register, which of the tamper detectors has detected a tamper event, what type (or types) of tamper attack or tamper attempt has (or have) occurred, and/or a severity level indicating how severely the secure memory device 116 has been tampered. For example, the larger the number of tamper detectors detecting the tamper events is, the higher the severity level can be. A specific type of tamper attack, e.g., physical damage detected by a laser direct structuring (LDS) circuitry, may be more severe than another type of tamper attack, e.g., a temperature change detected by a temperature detector.

The host device 120 can react or perform a tamper response based on the tamper detection status indicated by the values stored in the tamper detection status register. For example, the host device 120 can enable, e.g., send a command, to power down (or power off) the secure memory device 116 and/or the device 110, to disable the secure memory device 116, to erase data in the secure memory device 116, and/or to physically destroy the secure memory device 116. In some cases, the host device 120 can enable a tamper response based on a security level of the secure memory device 116 and/or a severity level of the tamper attacks or attempts detected by the tamper detectors in the secure memory device 116.

FIG. 2 illustrates an example of a secure memory device 200 with tamper detection and output, according to one or more implementations of the present disclosure. The secure memory device 200 can be implemented as the secure memory device 116 of FIG. 1A or 1B. Components in the secure memory device 200 can be integrated onto a board, e.g., a Si-based carrier board, and be packaged.

The secure memory device 200 can include a memory cell array 202, e.g., the memory cell array 150 of FIG. 1B, and a sense amplifier 204, e.g., the sense amplifier 160 of FIG. 1B. The secure memory device 200 can include one or more of the other components in the secure memory device 116 of FIG. 1B. For illustration purposes only, the other components are not presented in FIG. 2. The memory cell array 202 can have a number of memory cells. Each memory cell can include a memory transistor configured as a storage element to store data. In some implementations, as illustrated in FIG. 2, the secure memory device 200 can include a number of tamper detectors 220-1, 220-2, 220-3, . . . , 220-$n$ (referred to generally as tamper detectors 220 and individually as tamper detector 220). The tamper detectors 220 can be arranged on the board like other peripheral components or on the memory cell array 202.

Each tamper detector 220 can function independently from each other and be configured to a corresponding type of tamper event. In some cases, each of the tamper detectors 220 can be different from each other and configured to detect a different corresponding type of tamper event. In some cases, two or more tamper detectors 220 can be configured to detect the same type of tamper event. The two or more tamper detectors 220 can be arranged around or on the memory cell array 202 or the secure memory device 200.

In some examples, the tamper detector 220 can be a temperature sensor for detecting a change in an operating temperature of the memory cell array 202 or the secure memory device 200. In some examples, the tamper detector 220 can be a voltage sensor for detecting a change in an operating voltage of the secure memory device 200 (e.g., the memory cell array 202). In some examples, the tamper detector 220 can be a radiation sensor for detecting for X-rays and ion beams on the secure memory device 200 (e.g., the memory cell array 202). In some examples, the tamper detector 220 can be a laser direct structuring (LDS) circuitry for detecting an attempted intrusion. The LDS circuitry can include an intrusion detection mesh wrapped around the memory cell array 202 or the secure memory device 200 and a sensor configured to monitor a change of at least one parameter of the intrusion detection mesh. The parameter can include an impedance such as a capacitance, an inductance, or a resistance.

Each of the tamper detectors 220 can be configured to detect (or monitor) a change of a corresponding parameter associated with at least part of the secure memory device 200, (the memory cell array 202 or the secure memory device 200), e.g., an operating temperature, an operating voltage, an intensity of X-ray or ion-beam, or an impedance of the LDS circuitry. The tamper detector 220 can determine whether the detected change of the corresponding parameter exceeds a threshold. If the tamper detector 220 determines that the detected change of the corresponding parameter does not exceed the threshold, the tamper detector 220 can keep detecting (or monitoring) the change of the corresponding parameter. If the tamper detector 220 determines that the detected change of the corresponding parameter exceeds the threshold, the tamper detector 220 can determine that the corresponding tamper event is detected and/or that the tamper detection status of the secure memory device 200 is a tampered status.

In some implementations, as illustrated in FIG. 2, the secure memory device 200 can include a tamper detection status register 230. The tamper detection status register 230 can be in an SRAM that can be integrated on the board, together with the tamper detectors 220. The tamper detection status register 230 can be configured to store multiple values, and each of the values can indicate a tamper detection status detected by a corresponding tamper detector 220. Each of the tamper detectors 220 can be coupled to the tamper detection status register 230, e.g., through an electrically conductive line.

In some implementations, the tamper detection status register 230 can include multiple bits. Each bit can be used to indicate a tamper detection status detected by the corresponding tamper detector 220. In one example, if the bit has a value of logic 0, the bit can indicate that there is no tamper event detected by the corresponding tamper detector 220 and the tamper detection status is an untampered status. If the bit has a value of logic 1, the bit can indicate that the tamper detector 220 has detected a tamper event on the secure memory device 200, e.g., on the memory cell array 202, and the tamper detection status is a tampered status.

When the corresponding tamper event has been detected by the tamper detector 220, the tamper detector 220 can send a command to the tamper detection status register 230 to update the value of the bit. If the bit value indicates no tamper event, then the bit value is changed to indicate tampering. On the other hand, if the bit value already indicates tampering, the bit value is not changed. Continuing the prior example, if a previous bit value is a default value 0, the bit value is changed to 1. If the previous bit value is 1, the bit value remains at 1. Thus, the bits in the tamper detection status register 230 can indicate the tamper detection status detected by the tamper detectors 220.

The bits in the tamper detection status register 230 can be read out simultaneously, e.g., to a host device such as the host device 120 of FIG. 1A. The bits in the tamper detection status register 230 can be reset to a default value, e.g., after the bits are read out to the host device. The number of bits in the tamper detection status register 230 can be no less than the number of tamper detectors 220 in the tamper detection status register 230. If the number of bits is larger than the number of tamper detectors 220, extra bits in the tamper detection status register 230 can be set to the default value, e.g., 0, to indicate no tamper event.

In some implementations, the tamper detection status register 230 includes one or more counters. Each counter stores a value indicating a number of times that a corresponding tamper detector has detected a tamper event. Each counter can increase the corresponding value by 1 when the tamper detector 220 has detected a corresponding tamper event, for example, the tamper detector 220 can send a command to the tamper detection status register 230 to update the counter. Thus, the value can not only indicate whether the tamper event has been detected by the tamper detector 220 but also indicate how many times the tamper event has been detected by the tamper detector 220 since the value is reset to a default value, e.g., 0. The larger value can indicate more times (or a more severe level) that the secure memory device 200 has been tampered. Each value may be represented by one or more bits or bytes in the tamper detection status register 230.

In some implementations, the secure memory device 200 can include a backup battery, e.g., a built-in battery, for the tamper detectors 220 and the tamper detection status register 230. When the secure memory device 200 is powered down or off, the backup battery can provide power to the tamper detectors 220 and the tamper detection status register 230, and the tamper detectors 230 can keep detecting the tamper status of the secure memory device 200 and can update the values in the tamper detection status register 230. The values stored in the tamper detection status register 230 can be also read out in the power down or off mode.

In some implementations, as illustrated in FIG. 2, the secure memory device 200 includes a command interface 210 coupled to the memory cell array 202 (via the sense amplifier 204) and the tamper detection status register 230. The command interface 210 can be configured to receive an incoming command, e.g., from an external device such as the host device 120 of FIG. 1A, and enable access to one of the memory cell array 202 and the tamper detection status register 230 based on the incoming command. The command interface 210 can be configured to output the values stored in the tamper detection status register 230 when the command interface 210 receives a trigger.

In some examples, the command interface 210 can include a command decoder 212 configured to decode the incoming command and a data multiplexer 214 coupled to the memory cell array 202, the tamper detection status register 230, and the command decoder 212. The data multiplexer 214 can be controlled based on a result of decoding the incoming command, e.g., by the command decoder 212, to enable access to one of the memory cell array 202 and the tamper detection status register 230.

The command interface 210 can include an input pin 206, e.g., a serial input (SI) pin such as the SI/SIO0, SO/SIO1, SIO2, or SIO3 of the memory interface 130 of FIG. 1B, and an input buffer 216. The incoming command can be input to the command decoder 212 via the input pin 206 and the input buffer 216, e.g., the SRAM buffer 134 of FIG. 1B. The command interface 210 can also include an output pin 208, e.g., a serial output (SO) pin such as the SI/SIO0, SO/SIO1, SIO2, or SIO3 of the memory interface 130 of FIG. 1B. The data multiplexer 214 can be coupled to the output pin 208 via an output buffer 218, e.g., the output buffer 164 of FIG. 1B.

If the command decoder 212 decodes the incoming command to be an operation command on the memory cell array 202, the data multiplexer 214 can be controlled by the command decoder 212 to enable access to the memory cell array 202. The operation command can be a read command for reading data stored in the memory cell array 202, a write command for storing data in the memory cell array 202, or an erase command for erasing data stored in the memory cell array 202. For example, during a read operation, the data multiplexer 214 can output the read data from the memory cell array 202 via the output pin 208, e.g., to a host device.

If the command decoder 212 decodes the incoming command to be a read command for tamper detection status of the secure memory device 200 (e.g., the memory cell array 202), the data multiplexer 214 can be controlled by the command decoder 212 to enable access to the tamper detection status register 230 and output the values stored in the tamper detection status register 230 via the output pin 208, e.g., to a host device. In some examples, the read command can be a specific command code, e.g., 10101010. In some examples, the read command can be a specific signal, e.g., a high voltage signal or a toggle signal.

FIG. 3 is a circuit timing diagram 300 showing a read out of a tamper detection status of a secure memory device, according to one or more implementations of the present disclosure. The secure memory device can be the secure memory device 200 of FIG. 2 or the secure memory device 116 of FIGS. 1A-1B. A host device, e.g., the host device 120 of FIG. 1A, can issue a tamper detection status read command via a serial input (SI) pin, e.g., the input pin 206 of FIG. 2, to the secure memory device. Bits stored in a tamper detection status register, e.g., the tamper detection status register 230 of FIG. 2, can indicate the tamper detection status detected by tamper detectors of the secure memory device, e.g., the tamper detectors 220 of FIG. 2. The bits can be output via a serial output (SO) pin, e.g., the output pin 208 of FIG. 2, to the host device.

Row 302 shows a chip select signal asserted on a chip select bar (CSB) pin, e.g., the CS # pin of the memory interface 130 of FIG. 1B. The secure memory device can be unselected by asserting a higher chip select signal on the CSB pin and selected by changing the higher chip select signal to a lower chip select signal.

Row 304 shows a clock (CLK) signal in the secure memory device. The clock signal can oscillate between a higher and a lower state. The clock signal can be in a form of a square wave with a 50% duty cycle, e.g., with a fixed, constant frequency. The clock signal can be generated by a clock generator, e.g., the clock generator 141 of FIG. 1B, in the secure memory device. The clock generator can be configured to generate the clock signal for the secure memory device based on a synchronous clock input from an SLCK input, e.g., the SCLK 140.

Row 306 shows an input signal asserted on the SI pin. The SI pin can keep idle when there is no incoming command and become active when a read command is input on the SI pin and the secure memory device is selected by the chip select signal on the CSB pin. The read command can be a tamper detection status read command that can have a length of multiple clock cycles, e.g., as illustrated in FIG. 3, 8 clock cycles starting at a rising edge of a first clock cycle and ending at a falling edge of an eighth clock cycle.

Row 308 shows an output signal on the SO pin. When there is no output, the SO pin can be maintained at a high impedance (or high-Z or floating) state. That is, the SO pin is not being driven to a defined logic level by an output circuit, and the output signal is neither driven to a logical high nor low level. When the secure memory device receives the read command for tamper detection status, the secure memory device can output the bits stored in the tamper detection status register. The bits are stored as most significant bits (MSBs) in the tamper detection status register. As illustrated in FIG. 3, there can be 8 bits stored in the tamper detection status register. FIG. 4 illustrates an example tamper detection status register. Each bit, Bit0, Bit1, . . . , Bit7, can indicate a tamper detection status detected by a corresponding tamper detector, Sensor 0, Sensor 1, . . . , Sensor 7, in the secure memory device. The secure memory device can keep outputting the bits in the tamper detection status register to the host device, unless the secure memory device is unselected by the chip select signal on the CSB pin.

Figure 5:
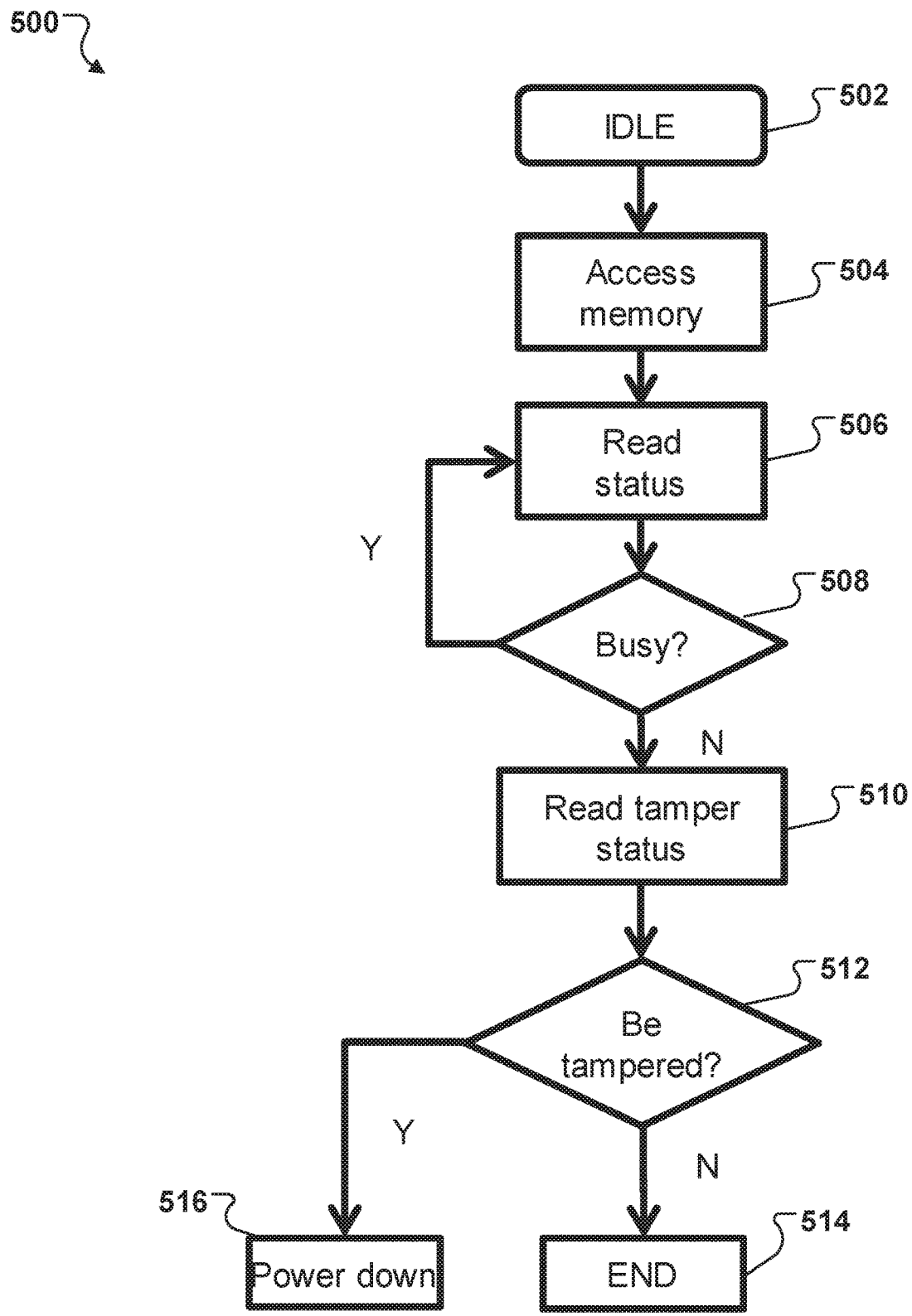
FIG. 5 illustrates a flow chart of an example of a process for managing tamper detections in a secure memory device, according to one or more implementations of the present disclosure.

FIG. 5 illustrates a flow chart of an example of a process 500 for managing tamper detections in a secure memory device, according to one or more implementations of the present disclosure. The process 500 can be performed by a host device, e.g., the host device 120 of FIG. 1A. The secure memory device can be the secure memory device 116 of FIGS. 1A-1B or the secure memory device 200 of FIG. 2. The secure memory device can include one or more tamper detectors, e.g., the tamper detectors 220 of FIG. 2, and a tamper detection status register, e.g., the tamper detection status register 230 of FIG. 2, that includes one or more values each indicating a tamper detection status detected by a corresponding tamper detector.

At 502, the secure memory device is idle. For example, the secure memory device is unselected by the host device. At 504, the secure memory device is selected, e.g., by a chip select signal on a CSB pin of the secure memory device, and the host device can assert an operation command to access a memory cell array, e.g., the memory cell array 202 of FIG. 2, in the secure memory device. The operation command can be a read command, a write command, and/or an erase command.

At 506, the host device reads a status of the operation command to determine whether the operation command has been completed. At 508, the host device determines whether the status is busy. If the status is the busy, the host device determines that the operation command has not been completed and returns to read the status at 506. If the status is not busy, the host device determines that the operation command has been completed.

At 510, in response to determining that the status is not busy, the host device reads the tamper detection status of the secure memory device, e.g., as illustrated in FIG. 3. The host device can transmit a read command for the tamper detection status to the secure memory device via an SI pin and receive an output of the bits in the tamper detection status register from the secure memory device via an SO pin.

At 512, the host device determines whether the secure memory device has been tampered based on the received bits in the tamper detection status register. For example, if any one of the values is 1, the host device can determine that the secure memory device has been tampered. If all the values are 0, the host device can determine that the secure memory device has not been tampered.

At 514, if the host device determines that the secure memory device has not been tampered, the process 500 ends. At 516, if the host device determines that the secure memory device has been tampered, the host device can perform a tamper response on the secure memory device, e.g., enable to power down the secure memory device.

FIG. 6 illustrates a block diagram of another example of a secure memory device 600 with tamper detection and output, according to one or more implementations of the present disclosure. The secure memory device 600 can be implemented as the secure memory device 116 of FIGS. 1A-1B.

As illustrated in FIG. 6, the secure memory device 600 can be similar to the secure memory device 200 of FIG. 2. The secure memory device 600 can have a memory cell array 602, e.g., the memory cell array 202 of FIG. 2, a sense amplifier 604, e.g., the sense amplifier 204 of FIG. 2, an output buffer 606, e.g., the output buffer 218 of FIG. 2, and a serial output (SO) pin 608, e.g., the SO pin 208 of FIG. 2. The secure memory device 600 can also include multiple tamper detectors 620-1, 620-3, 620-3, . . . , 620-n (referred to generally as tamper detectors 620 and individually as tamper detector 620) and a tamper detection status register 630. The tamper detectors 620 can be the tamper detectors 220 of FIG. 2. The tamper detection status register 630 can be the tamper detection status register 230 of FIG. 2. The tamper detection status register 630 can store multiple values each indicating a tamper detection status of a corresponding one of the tamper detectors 620.

In contrast to the secure memory device 200 of FIG. 2, the secure memory device 600 does not include a command interface like the command interface 210 of FIG. 2. That is, the secure memory device 600 does not include a command decoder like the command decoder 212 of FIG. 2 and a data multiplexer like the data multiplexer 214 of FIG. 2. Instead, the secure memory device 600 includes an additional output pin 610 as a tamper detection pin coupled to the tamper detection status register 630. The additional output pin 610 can be different from a serial pin on a memory interface, e.g., the memory interface 130 of FIG. 1B. The additional output pin 610 can be additional to the serial pin coupled to the memory cell array 602. The secure memory device 600 can include another output buffer 612 coupled between the tamper detection status register 630 and the additional output pin 610.

The secure memory device 600 can be configured to output the values stored in the tamper detection status register 630 via the additional output pin 610. For example, after a power on sequence, the secure memory device 600 is powered on and can automatically output the stored values via the additional output pin 610. For example, when a host device, e.g., the host device 120 of FIG. 1A, is coupled to the additional output pin 610, the host device can receive the values stored in the tamper detection status register 630 via the additional output pin 610, e.g., automatically without asserting a read command.

In some implementations, the secure memory device can include multiple additional output pins that are different from the serial input/output pins of the memory interface. Each of the additional output pin can be coupled to a corresponding tamper detector. The secure memory device can output a tamper detection status detected by the corresponding tamper detector via the additional output pin. The secure memory device can also include multiple tamper detection status registers. Each of the tamper detection status register can be coupled between a different corresponding tamper detector and a different corresponding additional output pin. The tamper detection status register can store a value indicating a tamper detection status detected by the different corresponding tamper detector and output the stored value via the different corresponding additional output pin, e.g., to a host device. The host device can be coupled to the multiple additional output pins and read, e.g., simultaneously or in parallel, selectively, or individually, the values stored in the multiple tamper detection status registers.

Figure 7:
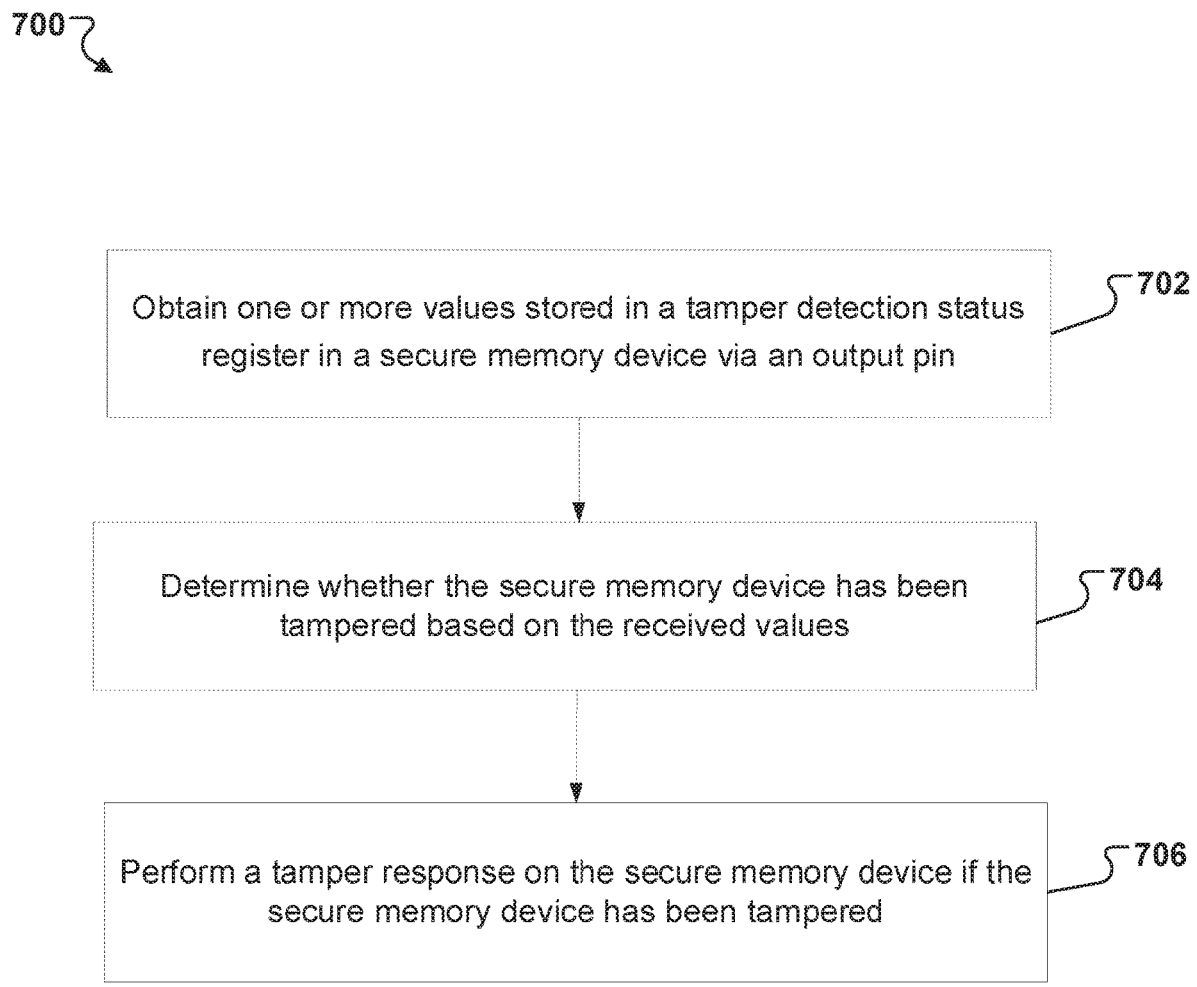
FIG. 7 illustrates a flow chart of another example of a process for managing tamper detections in a secure memory device, according to one or more implementations of the present disclosure.

FIG. 7 illustrates a flow chart of another example of a process 700 for managing tamper detections in a secure memory device, according to one or more implementations of the present disclosure. The secure memory device can be the secure memory device 116 of FIGS. 1A-1B, the secure memory device 200 of FIG. 2, or the secure memory device 600 of FIG. 6. The process 700 can be performed by a host device, e.g., the host device 120 of FIG. 1A, that is coupled to the secure memory device.

The secure memory device can include a memory cell array, one or more tamper detectors and a tamper detection status register. The memory cell array can be the memory cell array 150 of FIG. 1B, the memory cell array 202 of FIG. 2, or the memory cell array 602 of FIG. 6. Each of the tamper detectors can be the tamper detector 220 of FIG. 2 or the tamper detector 620 of FIG. 6, and be configured to detect a corresponding type of tamper event on the secure memory device. The tamper detection status register can be the tamper detection status register 230 of FIG. 2 or the tamper detection status register 630 of FIG. 6. The tamper detection status register can store one or more values, and each of the values can indicate a tamper detection status of a corresponding one of the tamper detectors.

The host device obtains the one or more values stored in the tamper detection status register via an output pin (702).

In some implementations, the secure memory device can include a command interface, e.g., the command interface 210 of FIG. 2. The command interface can include a command decoder, e.g., the command decoder 212 of FIG. 2, and a multiplexer, e.g., the data multiplexer 214 of FIG. 2. The command decoder can be configured to receive an incoming command from the host device via a serial input pin, e.g., the SI pin 206 of FIG. 2, and to decode the incoming command. The multiplexer can be coupled to the memory cell array, the tamper detection status register, and the command decoder, and be controlled by a result of decoding the incoming command to enable access to one of the memory cell array and the tamper detection status register.

If the command decoder decodes the incoming command to be an operation command on the memory cell array, the multiplexer can be controlled to enable access to the memory cell array. If the command decoder decodes the incoming command to be a read command for the tamper detection status of the secure memory device, the multiplexer can be controlled to access the tamper detection status register and output the one or more values stored in the tamper detection status register via the output pin to the host device. The output pin can be a serial output pin, e.g., the SO pin 208 of FIG. 2, to the host device. In some cases, as illustrated in FIG. 5, the host device can read a status of the memory cell array to determine whether an operation command is performing on the memory cell array. If the host device determines that there is an operation command, the host device can keep reading the status. If the host device determines that there is no operation command, the host device can transmit a read command for the tamper detection status to the secure memory device.

In some implementations, the output pin can be coupled to the tamper detection status register. The output pin can be an additional pin, e.g., the additional output pin 610 of FIG. 6, that is different from the serial pins coupled to the memory cell array. The secure memory device can be configured to automatically output the values stored in the tamper detection status register to the host device when the host device is coupled to the output pin. The secure memory device can automatically output the values when it is in a power on mode or in a power off mode if a backup battery is provided to the tamper detectors and the tamper detection status register.

In some implementations, the secure memory device can include a data multiplexer, e.g., the data multiplexer 214 of FIG. 2, and a pin. The pin can be a serial input/output (SIO) pin such as the SI/SIO0, SO/SIO1, SIO2, or SIO3 of the memory interface 130 of FIG. 1B. The pin can be also be an additional pin separate from the SIO pin. The data multiplexer can be coupled to the memory cell array and the tamper detection status register. The pin can be coupled to the data multiplexer. The host device can first assert a specific command code on the pin to the data multiplexer. The data multiplexer can be controlled by the specific command code to enable access to the tamper detection status register and output the values stored in the tamper detection status register to the host device via the pin.

The host device determines whether the secure memory device has been tampered based on the received values (704). For example, a value of logic 0 stored in the tamper detection status register can indicate that the secure memory device has not been tampered; while a value of logic 1 stored in the tamper detection status register can indicate that the secure memory device has been tampered. Thus, if the received values are all 0, the host device can determine that the secure memory device has not been tampered. If any one of the received values is 1, the host device can determine that the secure memory device has been tampered.

In response to determining that the secure memory device has not been tampered, the host device can keep performing steps 702 and 704. In response to determining that the secure memory device has been tampered, the host device performs a tamper response on the secure memory device (706). The tamper response can include at least one of: powering down (or off) the secure memory device, disabling the secure memory device, erasing data stored in the secure memory device, or physically destroying the secure memory device. In some cases, the host device can enable a different tamper response based on a security level of the secure memory device and/or a severity level of the tamper attacks or attempts detected by the tamper detectors in the secure memory device.

The disclosed and other examples can be implemented as one or more computer program products, for example, one or more modules of computer program instructions encoded on a computer readable medium for execution by, or to control the operation of, data processing apparatus. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform the functions described herein. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A secure memory device comprising:
a memory cell array having a plurality of memory cells;
a board;
one or more tamper detectors, each of the one or more tamper detectors being configured to detect a respective type of tamper event on at least part of the secure memory device; and
a tamper detection status register storing one or more values, each of the one or more values indicating a tamper detection status detected by a corresponding one of the one or more tamper detectors,
wherein each of the one or more tamper detectors is coupled to the tamper detection status register through an electrically conductive line within the secure memory device and configured to function independently from each other to update a corresponding value in the tamper detection status register when the tamper detector detects a corresponding tamper event,
wherein the tamper detection status register is stored in an internal memory, and
wherein the one or more tamper detectors and the internal memory are integrated on the board.

2. The secure memory device of claim 1, wherein each of the one or more tamper detectors is configured to:
detect a change of a corresponding parameter associated with the at least part of the secure memory device;
determine whether the detected change of the corresponding parameter exceeds a threshold;
in response to determining that the detected change of the corresponding parameter does not exceed the threshold, keep detecting the change of the corresponding parameter; and
in response to determining that the detected change of the corresponding parameter exceeds the threshold, transmit a command to the tamper detection status register to update the corresponding value in the tamper detection status register.

3. The secure memory device of claim 1, wherein the corresponding value is stored by a corresponding bit in the tamper detection status register, and
wherein the corresponding bit is updated to logic 1 when the tamper detector detects the corresponding tamper event, the corresponding bit being logic 0 indicating that there is no corresponding tamper event detected by the tamper detector.

4. The secure memory device of claim 1, wherein the corresponding value is stored by a corresponding counter in the tamper detection status register,
wherein the corresponding value is increased when the tamper detector detects the corresponding tamper event, and
wherein the corresponding value is increased by 1 when the tamper detector detects the corresponding tamper event.

5. The secure memory device of claim 1, further comprising:
a command interface coupled to the tamper detection status register and configured to output the one or more values stored in the tamper detection status register.

6. The secure memory device of claim 5, wherein the command interface comprises:
a command decoder configured to decode an incoming command; and
a multiplexer coupled to the memory cell array, the tamper detection status register, and the command decoder,
wherein the multiplexer is controlled based on a result of decoding the incoming command to enable access to one of the memory cell array and the tamper detection status register.

7. The secure memory device of claim 6, wherein the command decoder is configured to decode the incoming command to be a read command for the tamper detection status of the at least part of the secure memory device,
wherein the multiplexer is controlled to output the one or more values stored in the tamper detection status register, and
wherein the incoming command comprises one of:
a specific command code, and
a specific signal including a predetermined signal or a toggle signal.

8. The secure memory device of claim 6, wherein the command decoder is configured to decode the incoming command to be an operation command on the memory cell array,
wherein the multiplexer is controlled to enable access to the memory cell array, and
wherein the operation command comprises at least one of:
a read command for reading data stored in the memory cell array,
a write command for storing data in the memory cell array, or
an erase command for erasing data stored in the memory cell array.

9. The secure memory device of claim 6, wherein the command interface comprises:
a serial input pin coupled to the command decoder via an input buffer, and
a serial output pin coupled to the multiplexer via an output buffer.

10. The secure memory device of claim 5, wherein the command interface comprises:
a multiplexer coupled to the memory cell array and the tamper detection status register; and
a pin coupled to the multiplexer, the pin being a serial pin on a data bus or an additional pin,
wherein the multiplexer is configured to output the one or more values stored in the tamper detection status register when the pin is driven with a specific command.

11. The secure memory device of claim 1, further comprising:
an output pin coupled to the tamper detection status register, and
an output buffer coupled between the tamper detection status register and the output pin,
wherein the secure memory device is configured to output the one or more values stored in the tamper detection status register via the output pin, and
wherein the secure memory device is configured to automatically output the one or more values stored in the tamper detection status register via the output pin after the secure memory device is powered on.

12. The secure memory device of claim 11, wherein the output pin is additional to one or more serial output pins coupled to the memory cell array.

13. The secure memory device of claim 1, wherein the tamper detection status register is in a static random access memory (SRAM).

14. The secure memory device of claim 1, wherein the one or more tamper detectors comprise at least one of:

a temperature detector configured to detect a change of an operating temperature of the at least part of the secure memory device, a voltage detector configured to detect a change of an operating voltage of the at least part of the secure memory device, a radiation detector configured to detect an X-ray or ion beam on the at least part of the secure memory device, or laser direct structuring (LDS) circuitry comprising:
  an intrusion detection mesh wrapped around the at least part of the secure memory device, and
  a sensor configured to monitor a change of a parameter of the intrusion detection mesh, wherein the parameter comprises a capacitance, an inductance, or a resistance.

15. The secure memory device of claim 1, wherein the one or more tamper detectors are separated from each other and arranged around or on the memory cell array.

16. A system comprising:
a secure memory device comprising:
  a memory cell array having a plurality of memory cells;
  a board;
  one or more tamper detectors, each of the one or more tamper detectors being configured to detect a respective type of tamper event on at least part of the secure memory device; and
  a tamper detection status register storing one or more values, each of the one or more values indicating a tamper detection status detected by a corresponding one of the one or more tamper detectors,
  wherein each of the one or more tamper detectors is coupled to the tamper detection status register through an electrically conductive line within the secure memory device and configured to function independently from each other to update a corresponding value in the tamper detection status register when the tamper detector detects a corresponding tamper event,
  wherein the tamper detection status register is stored in an internal memory, and wherein the one or more tamper detectors and the internal memory are integrated on the board; and
a host device coupled to the secure memory device and configured to:
  obtain the one or more values stored in the tamper detection status register from the secure memory device, and
  determine whether the secure memory device has been tampered based on the obtained one or more values.

17. The system of claim 16, wherein the secure memory device comprises:
a command decoder configured to receive an incoming command from the host device via a serial input pin and to decode the incoming command; and
a multiplexer coupled to the memory cell array, the tamper detection status register, and the command decoder, the multiplexer being controlled based on a result of decoding the incoming command to enable access to one of the memory cell array and the tamper detection status register, wherein the command decoder is configured to decode the incoming command to be a read command for the tamper detection status of the secure memory device, and the multiplexer is controlled to access the tamper detection status register and output the one or more values stored in the tamper detection status register via a serial output pin to the host device.

18. The system of claim 16, wherein the secure memory device comprises an output pin coupled to the tamper detection status register, the output pin being additional to one or more serial pins coupled to the memory cell array, and
wherein the secure memory device is configured to automatically output the one or more values stored in the tamper detection status register via the output pin to the host device.

19. The system of claim 16, wherein the host device is configured to:
in response to determining that the secure memory device has been tampered, perform a tamper response on the secure memory device, and
wherein the tamper response comprises at least one of:
  powering down the secure memory device,
  disabling the secure memory device,
  erasing data stored in the secure memory device, or
  physically destroying the secure memory device.

20. A method of managing tamper detections in a secure memory device, the method comprising:
receiving one or more values stored in a tamper detection status register in the secure memory device via an output pin, the secure memory device comprising one or more tamper detectors each configured to detect a respective type of tamper event on the secure memory device, each of the one or more values indicating a tamper detection status detected by a corresponding one of the one or more tamper detectors, wherein each of the one or more tamper detectors is coupled to the tamper detection status register through an electrically conductive line within the secure memory device and configured to function independently from each other to update a corresponding value in the tamper detection status register when the tamper detector detects a corresponding tamper event, wherein the tamper detection status register is stored in an internal memory, and wherein the one or more tamper detectors and the internal memory are integrated on a board in the secure memory device;
determining whether the secure memory device has been tampered based on the received one or more values in the tamper detection status register; and
in response to determining that the secure memory device has been tampered, performing a tamper response on the secure memory device.

21. The method of claim 20, further comprising:
transmitting a read command via an input pin to the secure memory device, the read command being for reading the tamper detection status of the secure memory device.

* * * * *